United States Patent [19]

Hui

[11] Patent Number: 5,740,201
[45] Date of Patent: Apr. 14, 1998

[54] DUAL DIFFERENTIAL AND BINARY DATA TRANSMISSION ARRANGEMENT

[75] Inventor: David Tinsun Hui, Poughkeepsie, N.Y.

[73] Assignee: International Business Machines Corporation, Armonk, N.Y.

[21] Appl. No.: 165,275

[22] Filed: Dec. 10, 1993

[51] Int. Cl.⁶ .............................. H04L 25/34; H04L 25/49
[52] U.S. Cl. ........................... 375/286; 375/259; 341/56
[58] Field of Search ........................ 341/76, 56, 57; 375/286, 288, 290, 289, 219, 220, 222, 259, 291, 293, 211, 260; 327/100, 122; 326/59; 364/786, 787

[56] References Cited

U.S. PATENT DOCUMENTS

| | | | |
|---|---|---|---|
| 3,508,076 | 4/1970 | Winder | 364/784 |
| 3,638,122 | 1/1972 | Gibson | 375/230 |
| 4,373,152 | 2/1983 | Jacobsthal | 375/286 X |
| 4,528,550 | 7/1985 | Graves et al. | 340/347 DD |
| 4,631,428 | 12/1986 | Grimes | 375/286 |
| 4,730,266 | 3/1988 | van Meerbergen et al. | 364/784 X |
| 4,740,907 | 4/1988 | Shimizu et al. | 364/784 |
| 4,916,653 | 4/1990 | Shimizu et al. | |
| 5,259,002 | 11/1993 | Carlstedt | 375/286 X |

*Primary Examiner*—Tesfaldet Bocure
*Assistant Examiner*—Bryan Webster
*Attorney, Agent, or Firm*—Lynn L. Augspurger

[57] ABSTRACT

Data transmission arrangement for transmitting data between integrated circuit chips in a computer comprises a driver circuit having inputs connected to two discrete data bits. The driver circuit converts the states of the two data bits to one of four possible output voltage levels on each of two data transmission conductors. A receiver circuit connected to the data transmission conductors converge the multi-level signals on the pair of transmission conductors into binary output signals for use in a receiving circuit chip. The driver circuit and receiver circuit are balanced circuits and symmetrically arranged such that essentially the same magnitude of current is drawn from the power bus independent of the value of the signal being transmitted, thereby eliminating Delta-I noise typically occurring on a power bus when binary data is transmitted.

6 Claims, 6 Drawing Sheets

DUAL DIFFERENTIAL AND BINARY DATA TRANSMISSION ARRANGEMENT

BACKGROUND OF THE INVENTION

The invention relates to computer circuits and, more specifically, to data communications between integrated circuit computer chips.

One major challenge in the design of high-performance computer systems is how to increase the speed with which the data is transferred among parts of the computer and the band width, that is, the number of data bits that can be transmitted in parallel. Particular limitations are faced in the design of computers implemented with very large-scale integrated circuits (VLSI). The number of terminals for outside connections on VLSI chips are severely limited, and space for transmission wiring is at a premium. Furthermore, the so-called Delta-I noise presents a serious obstacle to increasing the data rate and increasing the band width. Delta-I noise takes the form of noise spikes occurring on power supply leads as a result of the switching of binary signal gates between the ON and OFF states defining the opposite states of binary signals. The Delta-I noise tends to be a limiting factor in the transmission of binary data where a large number of binary signals are transmitted in parallel and at a relatively high frequency.

One known approach to minimizing the effect of Delta-I noise is the use of a differential driver circuit which converts one binary signal to two separate signals and transmits the two signals on two separate transmission wires. The value of the data transmitted on the two separate wires is derived at the receiving end by a differential receiver. A serious disadvantage of this approach is that two transmission wires, and therefore two connections to the integrated circuit chip, are needed for each bit of data. Since integrated circuit chips are typically I/O limited, i.e. the useful capacity of this chip is limited by the number of external connections and the use of two terminals for data bit is a serious drawback. Furthermore, this prior art approach minimizes the effect of Delta-I but does not reduce Delta-I noise.

SUMMARY OF THE INVENTION

These and other problems with the prior art are solved in accordance with the principles of this invention by means of a dual differential binary data transmission system employing a dual differential driver circuit at the transmitting end and a dual differential receiver circuit at the receiving end. The driver takes two independent input logic signals which it encodes into four states, defined in terms of four different voltage levels. The encoded signals are transmitted on two fully differential output lines such that each state change of any one or both of the inputs will move the signal levels on the output pair of lines in opposite directions. This insures that each input state has a unique output state and that the changes in current in the differential outputs add up to zero, thereby advantageously avoiding the Delta-I noise spikes which typically occur when a binary output data transmission driver switches between binary states.

A dual differential receiver, in accordance with this invention, has two inputs connected to the dual differential driver and decodes the received signals into two independent binary signals, corresponding to the independent binary signals applied to the driver circuit. Furthermore, the receiver is provided with matched transmission line impedances to minimize distortion due to transmission line reflections. The termination circuits are preferably selected to be of the same value to preserve the differential of the input signals. In accordance with one embodiment of the invention, the transmitter circuit and receiver circuit are constructed in a symmetrical fashion such that the circuits draw the same current for each of the signal states thereby minimizing Delta-I noise.

BRIEF DESCRIPTION OF THE DRAWING

An embodiment of the invention is described below with reference to the drawing, in which.

DETAILED DESCRIPTION

Figure 1:
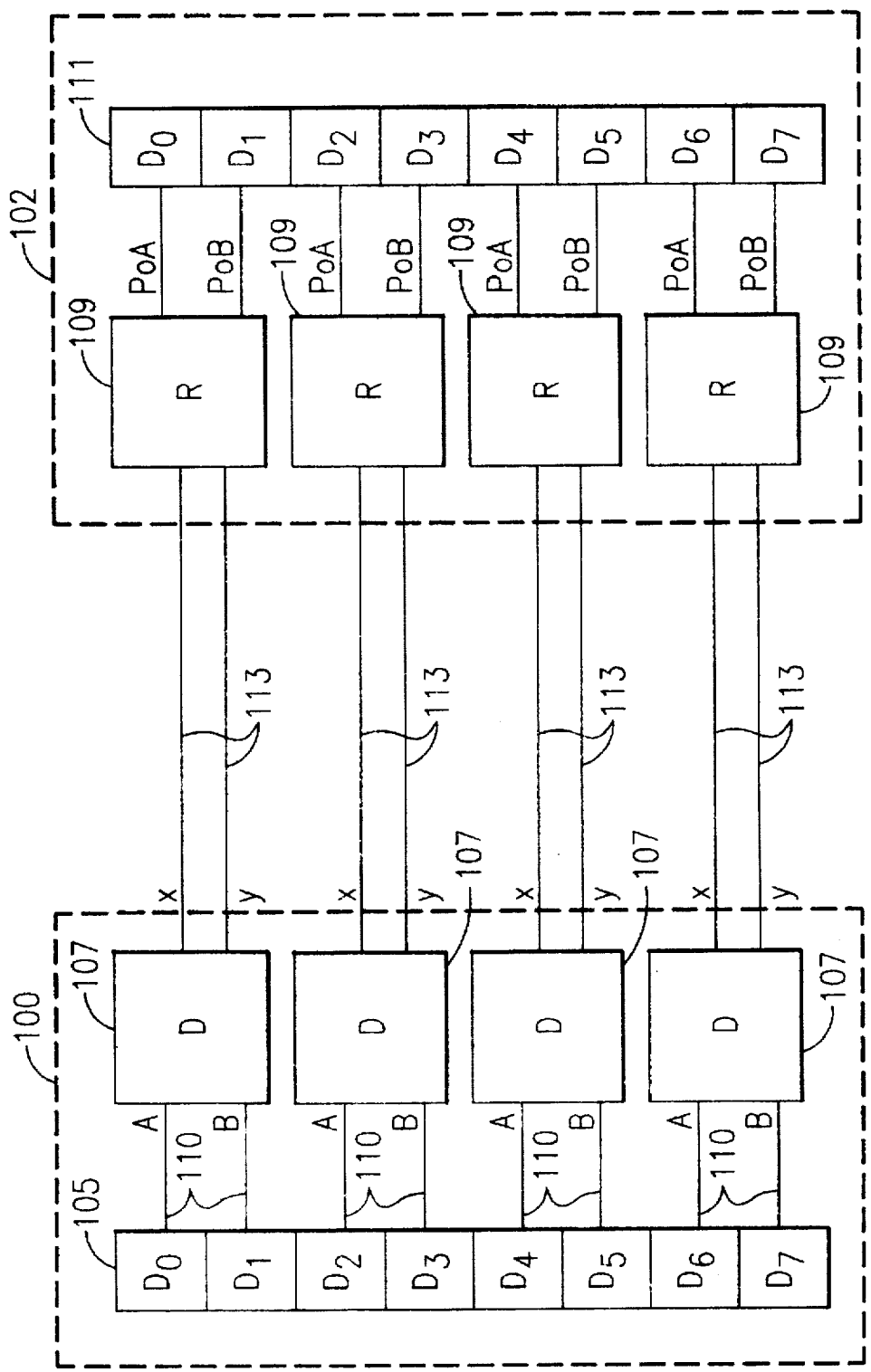
FIG. 1 is a block diagram representation of a pair of interconnected integrated circuit chips including data transmission drivers and receivers incorporating the principles of the invention.

In the block diagram of FIG. 1, two independent integrated circuit chips 100 and 102 are represented. The two chips are interconnected by means of a plurality of data transmission conductors 103. The integrated circuit chips 100 and 102 will each typically include a number or circuit elements. For the purposes of describing the invention, only a data output register 105 and a plurality of dual differential data transmission drivers 107 are shown in chip 100. Similarly, only an 8-bit input data register having bit locations D0 through D7, and dual differential receivers 109 are depicted in integrated circuit chip 102.

The data output register 105 is represented as an 8-bit register with discrete data storage locations D0 through D7 and with corresponding output leads 110 extending between the register 105 and the driver circuits 107. Each of the driver circuits 107 is connected to two of the discrete and independent bit locations of the register 105 and each driver is individually connected by a pair of transmission lines 103 to a dual differential receiver 109 on chip 102. Each of the receivers 109 is connected to two independent bit locations of input register 111. The four dual differential drivers 107 shown in FIG. 1 are identical circuits and are described in further detail with reference to FIGS. 3 and 4. Similarly, the dual differential receivers 109 are identical circuits and are described in further detail with reference to FIGS. 5 through 8.

Figures 2, 3:
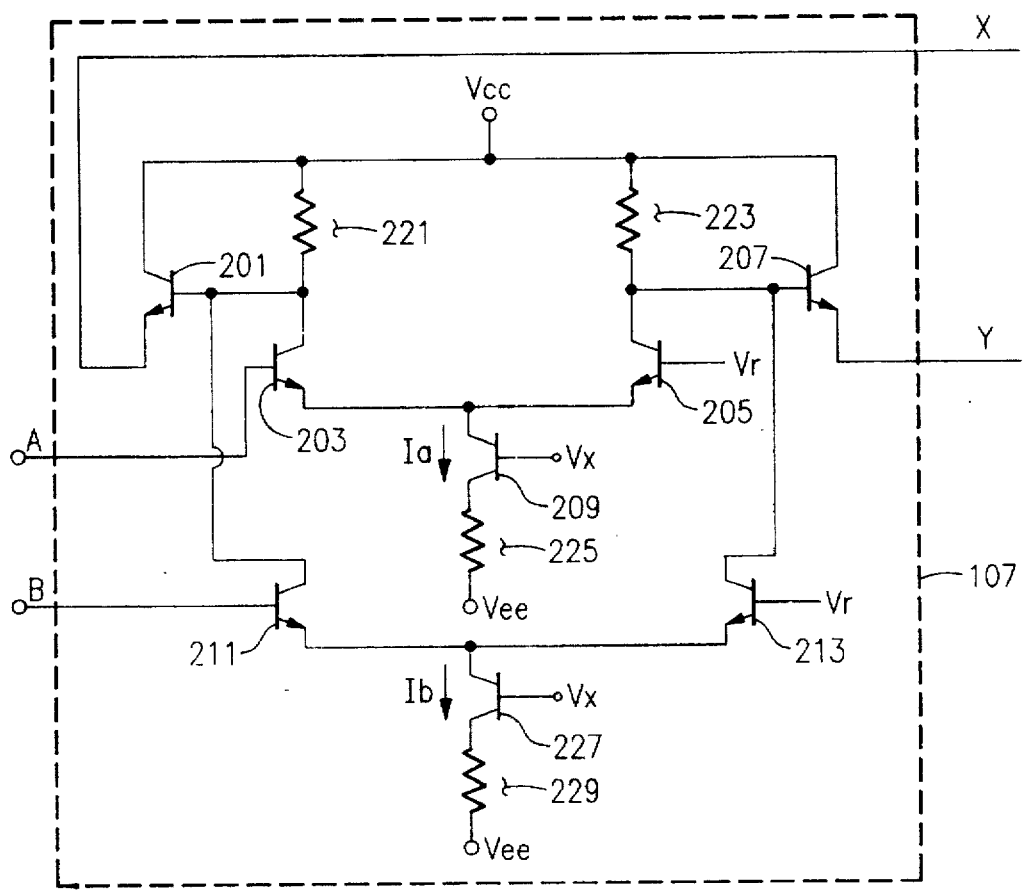
FIG. 2 is a state level diagram illustrating a level encoding scheme in accordance with the invention.
FIGS. 3 and 4 are schematic circuit representations of alternative circuit arrangement for implementing the driver circuit of FIG. 1.

The dual differential drivers 107, as mentioned earlier, each have two independent inputs referred to as A and B, connected to two independent register bit locations, and generate two output signals X and Y. The output signals X and Y may each represent four different voltage levels referred to as V0, V1, V2 and V3. The input signals A and B to the dual differential drivers 107 have either a high value representing a binary 1 or a low value representing a binary 0. The four possible combinations of 1's and 0's representing inputs A and B, are translated into four unique combinations of the voltages V0 through V3 as illustrated in Table A. FIG. 2 is a diagrammatic representation of the voltage levels at the different states of the A and B inputs to the drivers 107. Typical voltage values for V0 through V3 may, for example, be +0.6, +0.2, −0.2 and −0.6 volts, respectively.

TABLE A

| Driver Inputs | | Driver Outputs | | Receiver Inputs | | Receiver Output | |
|---|---|---|---|---|---|---|---|
| A | B | X | Y | X | Y | P01 | P02 |
| 0 | 0 | $V_0$ | $V_3$ | $V_0 >$ | $V_3$ | 0 | 0 |
| 1 | 0 | $V_1$ | $V_2$ | $V_1 >$ | $V_2$ | 1 | 0 |
| 0 | 1 | $V_2$ | $V_1$ | $V_2 <$ | $V_1$ | 0 | 1 |
| 1 | 1 | $V_3$ | $V_0$ | $V_3 <$ | $V_0$ | 1 | 1 |

The transmitter output signals at the different voltage levels are received as inputs by the dual differential receivers 109. Various ways for determining the level differences of the input voltage for the receivers may be devised. In a particular embodiment of this invention, the receiver includes a comparator circuit which provides a 0 output when the X input is greater than the Y input and a 1 when the X input is less than the Y input. As can be seen from Table A, this corresponds to the output P02. A second circuit generates an output signal when the signal levels V0 and V3 are applied to the input terminals. A third circuit provides an output signal which is exclusive-or function of the outputs of the first and second circuits. yielding the logical output corresponding to P01. This is further depicted in Table B.

TABLE B

| Receiver Inputs | | Receiver Circuit A Output | Receiver Circuit B Output | Receiver Circuit C Output |
|---|---|---|---|---|
| X | Y | P4 | P01 | P02 |
| $V_0 >$ | $V_3$ | 0 | 0 | 0 |
| $V_1 >$ | $V_2$ | 1 | 1 | 0 |
| $V_2 <$ | $V_1$ | 1 | 0 | 1 |
| $V_3 <$ | $V_0$ | 0 | 1 | 1 |

FIG. 3 is a schematic circuit representation of one of the driver circuits 107. FIG. 3 shows the inputs A and B and outputs X and Y. The A input lead is connected to a current switch consisting of transistors 203 and 205 and the B input lead is connected to a current switch consisting of transistors 211 and 213. The collectors of transistors 203 and 211 are tied together and connected through a collector pull-up resister 221 to the system voltage source Vcc. Similarly, the collectors of transistors 205 and 213 are connected together and through pull-up resistor 223 to the source Vcc. A current source Ia is generated by transistor 209 and resistor 225 connected between the emitter of transistor 209 and a voltage source Vee. A second current source Ib is generated by transistor 227 and resistor 229 which is connected to the voltage source Vee. The base of each of the transistors 209 and 227 is connected to an on-chip generated compensated voltage source. In this circuit, the values of resistors 221 and 223 are equal, and the value of the resistor 225 is approximately twice that of resistor 229. Therefore, the current source Ib is approximately twice the value of Ia. The input leads A and B are each connected to the base of one transistor of the associated current switch and in each case, the other transistor of the current switch has its base connected to a reference voltage Vr. The outputs X and Y are connected to emitter follower outputs of transistors 201 and 207, respectively. Typical voltage source levels for this circuit are: Vcc=1.4 volts; Vee=−2.2 volts; Vr=0.0 volts; Vx=−0.8 volts. The base of X output transistor 201 is connected to the collectors of input transistors 203 and 211 of the respective current switches and the base of Y output transistor 207 is connected to the collectors of transistors 205 and 213 of the current switches.

As will be apparent from FIG. 3, when both inputs A and B are at the 0 level (e.g., Vr−0.3 volts), currents Ia and Ib both flow through the resistor 223. Accordingly, the voltage level of the X output lead is equal to Vcc−Vbe, where Vbe is the base to emitter voltage drop of transistor 201. This is the driver output level $V_0$, depicted in FIG. 2. Correspondingly, the voltage level of the Y output will be Vcc−(Ia+Ib)×Rc−Vbe. This is the driver output level V3, depicted in FIG. 2. In this equation, Rc is the value of resistor 223, which is equal to the value of resistor 221 and Vbe is the base to emitter voltage drop of transistor 207.

When input A is a 1 (e.g. Vr+0.3 volts) and input B is at the 0 level, transistor 203 will turn on and transistor 211 will be in the off state, as before. As a consequence, the current Ia will flow through resistor 221 and the current Ib will flow through resistor 223. Accordingly, the voltage level of the X output is Vcc−Ia×Rc−Vbe, driver output level V1, and the voltage level of the Y output will be Vcc−Ib×Rc−Vbe, driver output level V2. Similarly, when input A is at the 0 level and input B is at the 1 level, transistor 203 is off and transistor 211 is in the on state. In that case, the current Ia flows through resistor 223 and current Ib flows through resistor 221. The voltage level of the X output lead will be Vcc−Ib×Rc−Vbe (level V2) and the voltage level of the Y output will be Vcc−Ia×Rc−Vbe (level V1). When both inputs A and B are in the 1 state, both transistors 203 and 211 will turn on and both currents Ia and Ib will flow through resistor 221. In that case, the voltage level of output X will be Vcc−(Ia+Ib)×Rc−Vbe (level V3) and the Y output voltage level will be Vcc−Vbe (level V0).

As can be seen from the above equations, when the current Ib is approximately twice the value of the current Ia, four different voltage levels are generated on each of the output leads X and Y defining the four separate states of the binary input leads A and B. The transistors 201 and 207 are preferably matched such that they have substantially identical Vbe characteristics. When the values of the resistors 221 and 223 are equal and the Vbe of the transistors 201 and 207 are equal, the voltage levels of the output driver are the same on both output terminals for any given state. This is particularly helpful with respect to signal tolerances.

Figure 4:
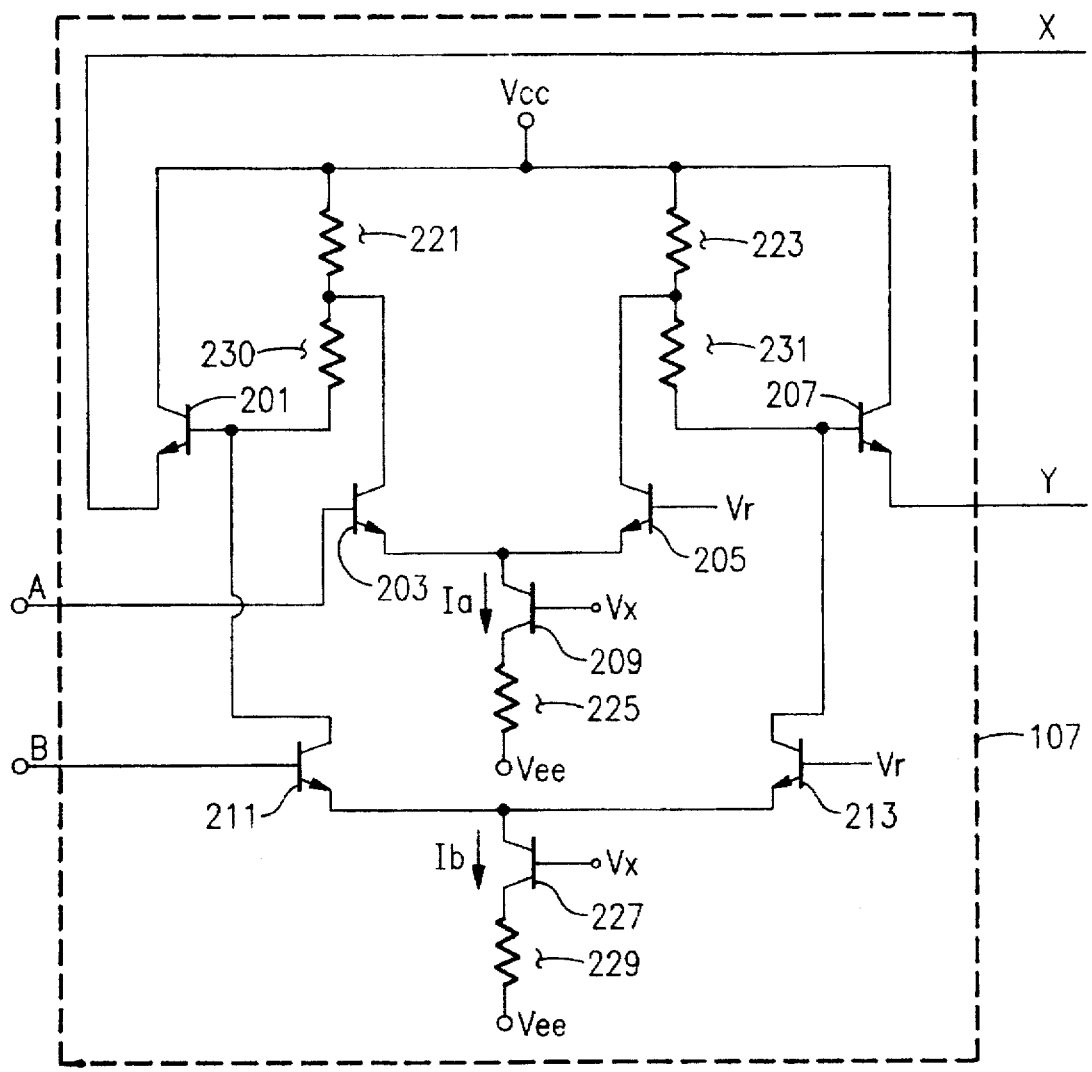

FIG. 4 is an alternate embodiment of the driver circuits 107. As in the embodiment of FIG. 103, the input leads A and B are connected to two current switches. Input A is connected to a current switch comprising the transistors 203 and 205 in which a current Ia flows and input B is connected to a current switch comprising transistors 211 and 213 in which the current Ib flows. Unlike the embodiment of FIG. 3, in this particular embodiment the currents Ia and Ib are substantially equal. A pair of resistors 230 and 231 have been added between the interconnected collectors of the current switches and the resistors 221, 223, as depicted in FIG. 4. With reference to FIG. 4, it will be apparent that in the condition in which both the A and B input leads are in the 0 state, the transistors 203 and 211 will be off and the current Ia will flow through resistor 223 and the current Ib will flow through resistor 223 and resistor 231. The value of resistors 221 and 223, as before, are equal and have the value Rc1 and resistors 230 and 231 are equal and have the value Rc2. In this case, the voltage level of the X output lead will be Vcc−Vbe (output level V0) and the value of the Y output lead will be Vcc−(2I×Rc1)−I×Rc2−Vbe (output level V3). Where I=Ia=Ib and the Vbe of transistors 201 and 207 are equal and represented by Vbe in the equation. When the A input is 1 and the B input is 0, transistor 203 will be turned on and transistor 211 will be off. In that case current Ia will flow through resistor 221 and current Ib will flow through resistor 223, in series with resistor 231. In that case, the voltage level of the X output is Vcc−Ib×Rc1−Vbe (output level V1) and the voltage level of the Y output is Vcc−Ia (Rc1+Rc2)−Vbe (output level V2). Correspondingly, when the A input is 0 and the B input is a 1, current Ia flows through resistor 223 and current Ib flows through resistor 230 in series with resistor 221. As a consequence, the voltage level of the X output lead is Vcc−Ib×(Rc1+Rc2)−Vbe (output level V2) and the voltage level of the Y output is Vcc−Ia×Rc1−Vbe (output level V1). In the event where both inputs A and B are equal to 1, the X output is Vcc−2Ib×Rc1−Ia×Rc2−Vbe (output level V3) and the Y output equals Vcc−Vbe (output level V0). Typical voltage values of the output levels are: V0=+0.6v.; V1=+0.2v.; V2=−0.2v.; V3=−0.6v. The problem of excessive Delta-I noise generation is overcome by the use of differential current cancellation in both the driver circuit of FIG. 3 and FIG. 4. In both circuits the currents Ia and Ib both flow continually and with the same magnitude, independent of the states of the input signals. Thus, there is no change in power supply drain when input signals change state, thus eliminating Delta-I noise spikes.

Figure 5:
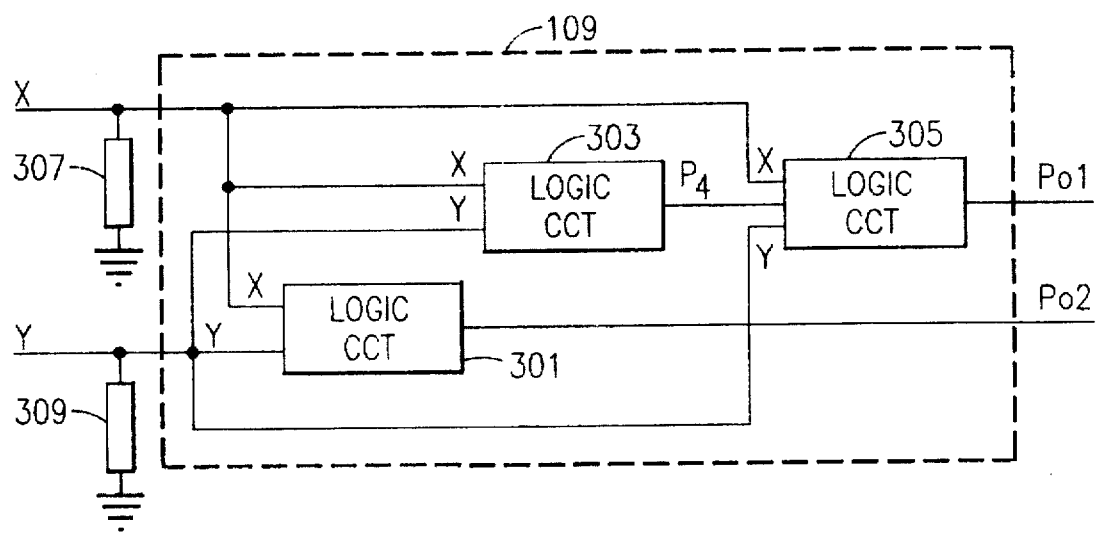
FIG. 5 is a block diagram representation of the receiver circuit of FIG. 1.

FIG. 5 is a block diagram representation of one of the receivers 109 showing a circuit 301 which receives the X and Y inputs to the receiver 109 and generates an output P02 of the receiver. As shown in Table A, the output P02 is equal to 0 whenever the X input is greater than the Y input and is equal to 1 whenever the X input is less than the Y input. Thus, P02 can be readily derived by a comparison of the X and Y inputs. The circuit of block 301 is shown in greater detail in FIG. 6. Circuit block 303 of FIG. 5 represents a circuit which provides an output P4 which is 0 the voltage levels of inputs X and Y are V0, V3 or V3, V0, as depicted in Table B above. The circuit of block 303 is shown in greater detail in FIG. 7. The circuit block 305 in FIG. 5 represents a third circuit, shown in greater detail in FIG. 8, which uses the P4 output of block 303 and the X and Y inputs to generate the EXCLUSIVE-OR of P02 and P4, thereby generating the output P01.

Termination circuits 307 and 309 are shown in FIG. 5 connected to the input leads X and Y. These networks form the emitter follower resistors for X and Y output transistors 201 and 207, while providing appropriate terminations for cancelling transmission line reflections on the conductors 103. The impedance of the termination networks 307, 309 is preferably the same. As described earlier with respect to FIGS. 2 and 3, the voltage on the driver output leads X, Y is the same for like output levels, e.g., the magnitude of the voltage for Vo on X is substantially the same as for Vo on Y. Thus, with like termination impedances, the currents on the X, Y transmission conductors 103 will be the same. Furthermore, as can be seen from FIG. 2, the voltages of X and Y change by the same number of levels, and in the opposite direction, with each change of inputs A, B. As a consequence, the change in current in the X and Y transmission conductors 103 is of equal magnitude, but in opposite direction, with each change in inputs A, B. In this manner, the change in current drawn by the circuits is minimized and Delta-I noise is greatly reduced.

Figure 6:
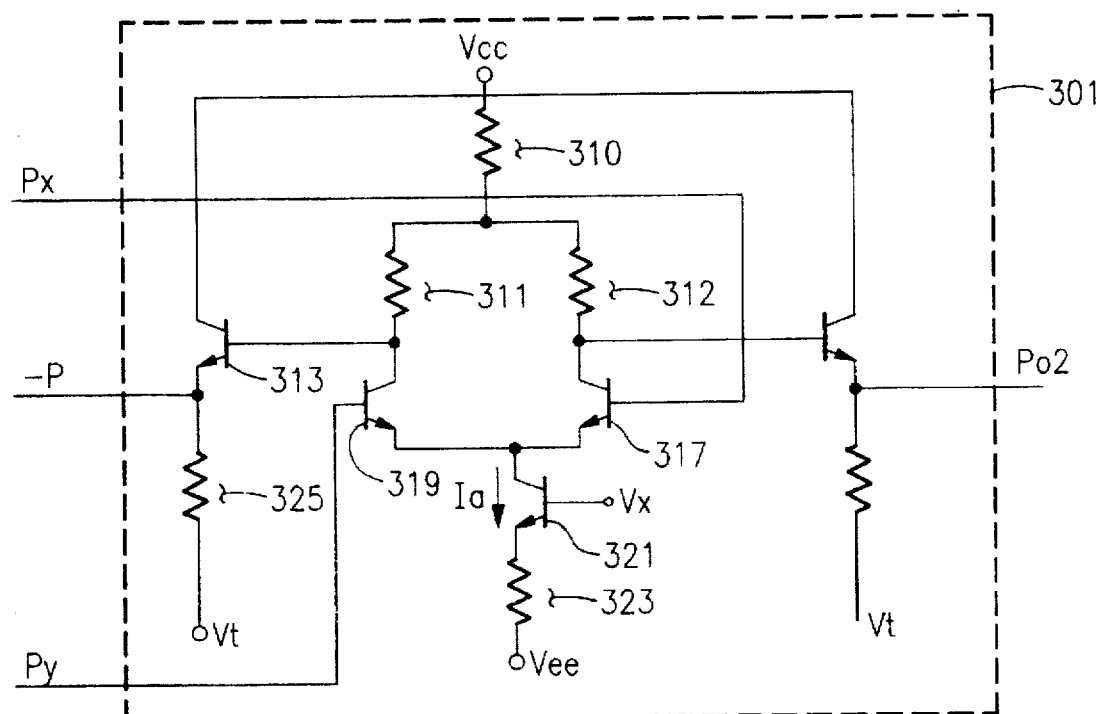
FIGS. 6, 7 and 8 are schematic circuit representations of blocks of FIG. 5.

Shown in FIG. 6 is a circuit implementation of the block 301 of FIG. 5 which generates the P02 output signal of the receiver 109. Input signals PX and PY are connected to opposite transistors of a current switch incorporating transistors 317 and 319. A current source Ia is formed by transistor 321 and resistor 323 connected a voltage source Vee. When PY is greater than PX, the transistor 319 will be turned on and the current Ia will flow through resistor 310 and resistor 311. The values of the voltage sources and resistors in the circuit are chosen such that output transistor 315 will be turned on when the current Ia is drawn through resistor 311. As a result, current through emitter follower resistor 327 provides a voltage level indicating a logical 1 at the output P02. Conversely, when the level of input PX is higher than the level of input PY, the transistor 317 is turned on and the current Ia flows through resistor 312 pulling down the voltage on the base of transistor 315 with the result that P02 is at a low output voltage (logical 0) as determined by the voltage source Vt. The output-P02 is the complement of P02 and is provided at the emitter follower output of transistor 313 and resistor 325.

Figure 7:
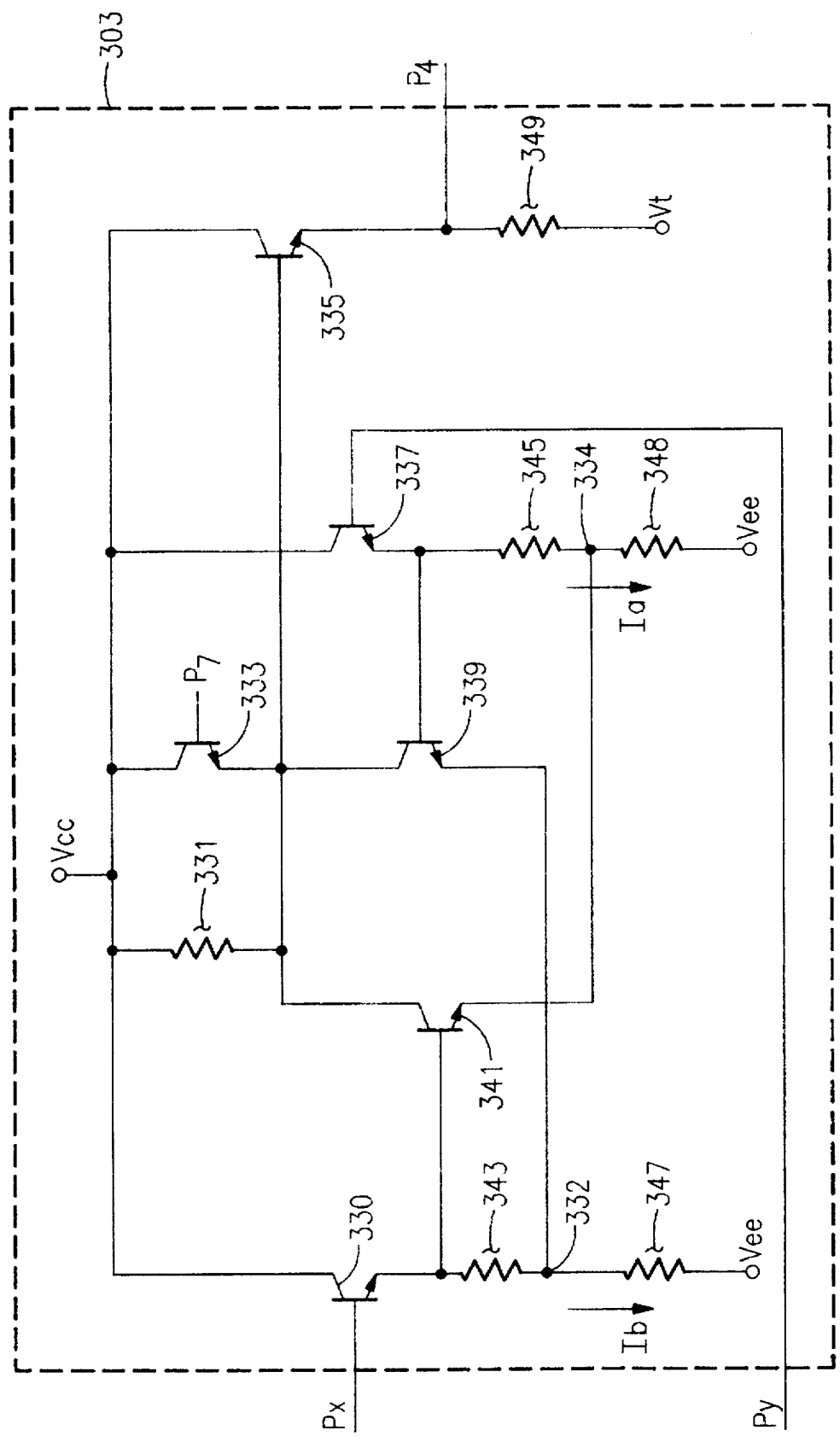

FIG. 7 is a circuit diagram representation of the circuit block 303 of FIG. 5. As shown in FIG. 7, the inputs PX and PY are applied to input emitter follower transistors 330 and 337, with pull-down resistors 343, 347 and 345, 348, respectively. Transistor 330, together with resistor 343 and transistor 339 form a modified current switch with a current source Ib formed by the resistor 347 connected to the voltage source Vee. Similarly, transistor 337 and resistor 345 together with transistor 341 form a modified current switch with a current source Ia formed by resistor 348, connected to Vee. When the input PX is equal to V0 and PY is equal to V3, the voltage level difference between the base of transistor 330 (e.g. +0.6v.) and Vee (e.g. −2.2v.) is sufficient to turn this transistor on when transistor 330 is turned on, the transistor 341 to be turned on as well. With PY at V3 (e.g. −0.6v.), the transistor 337 will be in the off state. Current Ia will flow through resistor 331 and transistor 341, through resistor 348 to the source Vee. As a result of the voltage drops of resistor 331, the collector of the transistor 341 will be pulled down. Transistor 333, which has a base connected to a clamping voltage P7, will be turned on to prevent the transistor 341 from going into the saturation state. The transistors are preferably prevented from going into the saturation state to avoid longer transistor switching times associated with that state. The collector voltage of transistor 341 is buffered through an emitter follower transistor T335 with a pull-down resistor 349 which is connected to a voltage source Vt. With the collector of transistor 341 at a low level, the transistor 335 is at a 0 logic level. As a consequence, the node P4 will be at a low level corresponding to a logical 0.

In the event that the input PX is equal to V3 (e.g. −0.6v.) and PY is equal to V0 (e.g. +0.6v.) the transistor 337 will be turned on, as will transistors 339, and the current Ib will flow through the resistor 331. As a consequence, the node of transistor 339 is pulled down and the transistor 333 is turned on to prevent saturation of transistor 339. Accordingly, the low collector voltage level applied to the base of transistor 335, causes the transistor 335 to be in off state and causes the node P4 to be at a low voltage level corresponding to a logical 0.

In the event the pair of voltages V1 (e.g. +0.2v.) and V2 (e.g. −0.2 v.) are applied to the input conductors PX and PY, the differences between the voltages on the nodes 332 and 334 will not be sufficient to cause either the transistors 339 or 341 to conduct a significant amount of current. Accordingly, there will be no significant voltage drop across the resistor 331 providing a high voltage to the base of transistor 335 causing current flow through the transistor 335 and resistor 349. Thus, the level of the node P4 will be high, corresponding to a logical 1.

Figure 8:
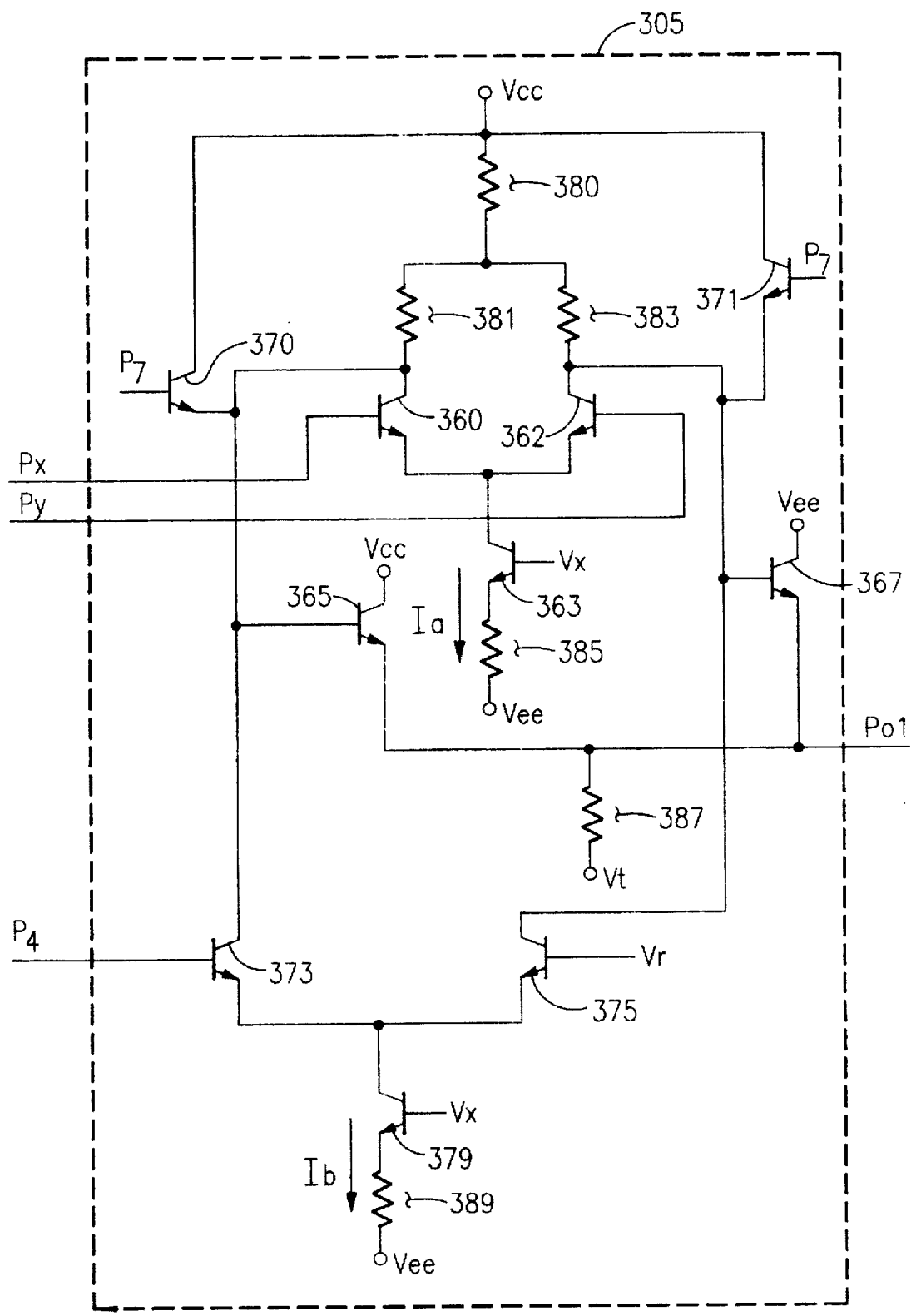

FIG. 8 is a circuit diagram representation of the circuit block 305 in FIG. 5. It has as inputs the PX and PY input leads as well as a lead labeled P4, connected to the node P4 of the circuit 303 shown at FIG. 7. Referring to FIG. 8, the inputs PX and PY are connected to bases of transistors 360 and 362, respectively which form a current switch with the current source consisting of the transistor 363 having a base connected to a compensation voltage Vx and resistor 385 connected to voltage source Vee. A current Ia flows through the transistor 360 and resistors 380 and 381 when the input PX is greater than the input PY. This is the case when PX is V0 and PY is V3 and when PX is V1 and PY is V2. Under those circumstances, the collector of the transistor 360 is at a low voltage level and the collector of transistor 362 is at an comparatively high voltage level. In the case where PY is greater than PX, i.e. when PY is equal to V0 and PX is equal to V3 or PY is equal to V1 and PX is equal to V2, the current Ia will flow through resistor 383 and transistor 362 and the collector of the transistor 362 will assume a low voltage level. Thus, the collector of the transistor 362 represents the state of output lead P02 as shown in Tables A and B. The transistors 370 and 371 are connected to a clamping voltage P7 in order to prevent the transistors 360 and 362 from going into saturation.

The signal on input lead P4 from circuit 303 is connected to one transistor 373 of a current switch formed with transistor 375, having a base connected to a reference voltage Vr. A current source conducting current Ib through the current switch is formed by transistor 379, having its base connected to voltage source Vx and resistor 389 connected to voltage source Vee. The collectors of the current switch formed by the transistor 373 and 375 are connected to corresponding collectors of the current switch formed by the transistor 360 and 362. When the input on P4 is of a high voltage indicating a logical 1, and PY is greater than PX (P02=1), the two transistors 373 and 362 will be turned on such that the current Ib flows through the transistor 373 and the current Ia flows through the transistor 362. As a consequence, the collector nodes of these two resistors will be low and the base inputs of output transistors 365 and 367 will both be low. These transistors are connected at their emitters and form an emitter follower arrangement with the output P01 connected to the emitter follower resistor 387. With a low input to both transistors 365 and 367, the output P01 will be low (logical 0).

When the input P4 is low and Px is greater than Py (P02=0) the transistors 360 and 375 will be turned on and the inputs to emitter follower transistors 365 and 370 will again be low with the consequence that the output P01 will be low (logical 0). In the event that PX is greater than PY (P02=0) and P4 is high, the transistors 360 and 373 will be turned on and the input to transistor 365 will be low but the input to transistors 367 will be high with consequence that current will flow through the emitter follower resistor 387 and the level of P01 will be high (logical 1). Similarly, when PX is less than PY (P02=1) and P4 is low, the transistors 362 and 375 will be turned on with the consequence that the input to emitter follower transistor 367 is high, causing current flow in the emitter follower resistor 387 and yielding a high value for the output P01 (logical 1). The transistors 370 and 371 are connected at their respective bases to a clamping voltage P7 and provide current to the collectors of the transistors 360, 373 and 362, 375, respectively to prevent these transistors from going into the saturation state.

As can be seen with reference to Tables A and B, and the above circuit descriptions, the receiver circuit 109 provides two discrete binary outputs P01 and P02 in response to different combinations of four distinct voltage levels on a pair of conductors X and Y connected to the driver circuit 107 which generates the four distinct voltage levels in response to two discrete binary inputs.

It will be understood that the above-described embodiment is only illustrative of the principles of the invention and that other embodiments may be devised by those skilled in the art without departing from the spirit and scope of the invention.

What I claim is:

1. In a computer system comprising a plurality of subsystems, data transmission apparatus arranged to reduce Delta-I transmission noise in the transmission of a multibit data word between the subsystems, the transmission apparatus comprising:

a data register having a plurality of data bit locations and storing a plurality of independent binary encoded data signals each defined by two discrete signal levels; a data transmitter having a pair of transmitter input terminals connected to a pair of the data bit locations and a pair of transmitter output terminals and responsive to two independent binary encoded data signals stored in the pair of data bit locations and concomitantly occurring on the pair of transmitter input terminals to simultaneously generate two separate, four level encoded output signals on the pair of transmitter output terminals, the two separate output signals having differing signal levels for each combination of the two independent binary encoded data signals, the combination of output signals on the pair of transmitter output terminals together defining the states of the signals on the transmitter input terminals;

a pair of transmission conductors, each transmission line connected to one of the transmitter output terminals;

a dual differential receiver having a pair of receiver output terminals and a pair of receiver input terminals, each receiver input terminal connected to one of the transmission conductors, the receiver responsive to the two separate four level output signals on the pair of transmitter output terminals to simultaneously generate on the pair of receiver output terminals a pair of binary encoded signals, each binary encoded signal generated on the receiver output terminals defined by two discrete signal levels, the pair of binary encoded output signals on the pair of receiver output terminals corresponding to the binary encoded signals on the pair of transmitter input terminals, and wherein the data transmitter further comprises first second interconnected current switches connected to first and second common nodes and wherein the first transmitter input terminal is connected to the first current switch and the second transmitter input terminal is connected to the second current switch and the first and second transmitter output terminals are connected to the first and second common nodes, respectively.

2. In a computer system comprising a plurality of subsystems, data transmission apparatus arranged to reduce Delta-I transmission noise in the transmission of a multibit data word between the subsystems, the transmission apparatus comprising:

a data register having a plurality of data bit locations and storing a plurality of independent binary encoded data signals each defined by two discrete signal levels;

a data transmitter having a pair of transmitter input terminals connected to a pair of the data bit locations and a pair of transmitter output terminals and responsive to two independent binary encoded data signals stored in the pair of data bit locations and concomitantly occurring on the pair of transmitter input terminals to simultaneously generate two separate, four level encoded output signals on the pair of transmitter output terminals, the two separate output signals having differing signal levels for each combination of the two independent binary encoded data signals, the combination of output signals on the pair of transmitter output terminals together defining the states of the signals on the transmitter input terminals;

a pair of transmission conductors, each transmission line connected to one of the transmitter output terminals;

a dual differential receiver having a pair of receiver output terminals and a pair of receiver input terminals, each receiver input terminal connected to one of the transmission conductors, the receiver responsive to the two separate four level output signals on the pair of transmitter output terminals to simultaneously generate on the pair of receiver output terminals a pair of binary encoded signals, each binary encoded signal generated on the receiver output terminals defined by two discrete signal levels, the pair of binary encoded output signals on the pair of receiver output terminals corresponding to the binary encoded signals on the pair of transmitter input terminals, and wherein the four level output signals each comprise four discrete voltage levels resulting in current flow of four corresponding distinct magnitudes in each of the transmission conductors and wherein the data transmitter is responsive to a change in the binary encoded signal to generate changes in voltage levels on the pair of output terminals such that the voltage level on one of the pair of output terminals is changed in a direction opposite to a change in voltage level on the other of the pair of output terminals, thereby causing changes in current on the pair of transmission conductors in opposite directions, whereby extraneous noise signals are reduced.

3. In a computer system comprising a plurality of subsystems, data transmission apparatus arranged to reduce Delta-I transmission noise in the transmission of a multibit data word between the subsystems, the transmission apparatus comprising:

a data register having a plurality of data bit locations and storing a plurality of independent binary encoded data signals each defined by two discrete signal levels;

a data transmitter having a pair of transmitter input terminals connected to a pair of the data bit locations and a pair of transmitter output terminals and responsive to two independent binary encoded data signals stored in the pair of data bit locations and concomitantly occurring on the pair of transmitter input terminals to simultaneously generate two separate, four level encoded output signals on the pair of transmitter output terminals, the two separate output signals having differing signal levels for each combination of the two independent binary encoded data signals, the combination of output signals on the pair of transmitter output terminals together defining the states of the signals on the transmitter input terminals;

a pair of transmission conductors, each transmission line connected to one of the transmitter output terminals;

a dual differential receiver having a pair of receiver output terminals and a pair of receiver input terminals, each receiver input terminal connected to one of the transmission conductors, the receiver responsive to the two separate four level output signals on the pair of transmitter output terminals to simultaneously generate on the pair of receiver output terminals a pair of binary encoded signals, each binary encoded signal generated on the receiver output terminals defined by two discrete signal levels, the pair of binary encoded output signals on the pair of receiver output terminals corresponding to the binary encoded signals on the pair of transmitter input terminals, and wherein the receiver comprises a first current switch connected to the first and second receiver input terminals and one of the receiver output terminals and responsive to input signals applied to the first and second receiver input terminals to generate an output signal of a first discrete signal level on the one of the receiver output terminal when a signal applied to the first receiver input terminals is greater than a signal applied to the second receiver input terminal and responsive to generate an output signal of a second discrete signal level on the one of the output receiver terminals when a signal applied to the second receiver input terminal is greater than a signal applied to the first receiver input terminal.

4. The apparatus in accordance with claim 3 wherein the receiver circuit further comprises a circuit connected to the first and second receiver input terminals and to an intermediate output terminal and responsive to signals applied to the first and second receiver input terminals to generate an intermediate output signal on the intermediate output terminal only when signals of predefined levels are applied to the first and second input receiver input terminals.

5. The apparatus in accordance with claim 4 wherein the intermediate output signal is generated only when signals of the highest and lowest levels of the four level input signals are applied to the first and second receiver input terminals.

6. The apparatus in accordance with claim 4 wherein the receiver further comprises an output circuit connected to the first and second receiver input terminals and to the intermediate output terminal and to an other of the output terminals, the output circuit responsive to four level input signals applied to the first and second receiver input terminals and to the intermediate output signal to generate an output signal on the other output terminal when the intermediate output indicates that signals of the predefined levels are applied to the receiver input terminals and the level of the signal applied to the first input terminal is greater than the level of the signal applied to the second input terminal and when the intermediate output indicates that signals of the predefined levels are not applied to the first receiver input terminal and the level of the signal applied to the first input terminal is less than the level of the signal applied to the second receiver input terminal.

* * * * *